United States Patent [19]
Comte et al.

[11] Patent Number: 5,760,645
[45] Date of Patent: Jun. 2, 1998

[54] DEMODULATOR STAGE FOR DIRECT DEMODULATION OF A PHASE QUADRATURE MODULATED SIGNAL AND RECEIVER INCLUDING A DEMODULATOR STAGE OF THIS KIND

[75] Inventors: Michel Comte, Sainte Livrade; Gérard LeClerc, Osny, both of France

[73] Assignee: Alcatel Telspace, Nanterre Cedex, France

[21] Appl. No.: 744,146

[22] Filed: Nov. 12, 1996

[30] Foreign Application Priority Data

Nov. 13, 1995 [FR] France .................... 95 13417

[51] Int. Cl.[6] ............................ H03D 3/00; H04L 27/227
[52] U.S. Cl. .................... 329/304; 329/306; 375/329; 455/293; 455/323; 455/333
[58] Field of Search ........................... 329/304–310; 327/238, 254, 255; 333/100, 109, 117, 24 R, 24 C, 24.1–24.3; 455/313, 323, 325, 333, 293, 294, 214; 375/329–333

[56] References Cited

U.S. PATENT DOCUMENTS

| | | | |
|---|---|---|---|
| 4,174,489 | 11/1979 | Guidoux et al. | 325/320 |
| 4,338,574 | 7/1982 | Fujita et al. | 331/1 A |
| 4,379,264 | 4/1983 | Lenhardt | 327/238 X |
| 4,394,626 | 7/1983 | Kurihara et al. | 331/12 |
| 4,996,718 | 2/1991 | Shiomi | 455/323 |
| 5,285,120 | 2/1994 | Landt | 333/100 X |
| 5,440,266 | 8/1995 | Ono | 329/307 |
| 5,442,582 | 8/1995 | Lange et al. | 364/825 |

FOREIGN PATENT DOCUMENTS

0070695A2 1/1983 European Pat. Off.
0153835A3 9/1985 European Pat. Off.

OTHER PUBLICATIONS

"New Zero IF Chipset from Philips", Electronic Engineering, vol. 67, No. 825, Sep., 1995, London, GB, p. 10.

Primary Examiner—David Mis
Attorney, Agent, or Firm—Sughrue, Mion, Zinn, Macpeak & Seas, PLLC

[57] ABSTRACT

A demodulator stage for direct demodulation of a phase quadrature modulated signal provides two baseband signals and comprises a matched 900° coupler to which the modulated signal is fed and supplying two phase quadrature modulated signals. Two low-noise amplifiers with identical specifications each receive one of the phase quadrature modulated signals and supply an amplified signal. Two mixers each receive one of the amplified signals and a common local oscillator signal and supply the baseband signals. The 90° coupler, the low-noise amplifiers and the two mixers can be integrated into the same MMIC. One application is to a receiver for frequency evasive phase quadrature modulated signals.

8 Claims, 1 Drawing Sheet

DEMODULATOR STAGE FOR DIRECT DEMODULATION OF A PHASE QUADRATURE MODULATED SIGNAL AND RECEIVER INCLUDING A DEMODULATOR STAGE OF THIS KIND

BACKGROUND OF THE INVENTION

1. Field of the Invention

The field of the invention is that of demodulating signals having a plurality of phase states and to be more precise concerns a demodulator stage for direct demodulation of a phase quadrature modulated signal and a receiver including a demodulator stage of this kind.

2. Description of the Prior Art

FIG. 1 shows a prior art demodulator stage for direct demodulation of a phase quadrature modulated signal, for example a radio frequency (RF) signal received via an antenna.

The demodulator stage 10 of FIG. 1 receives at its input a modulated RF signal picked up by an antenna 11. The RF signal is fed to an isolator 12 followed by a low-noise amplifier 13. The output signal of the amplifier 13 is fed to a signal splitter 14 producing two identical output signals attenuated 3 dB relative to its input signal. The output signals of the separator 14 are each fed to a mixer 15, 16. Each mixer 15, 16 receives a demodulation signal from a local oscillator 17, the mixer 15 receiving this demodulation signal via a 90° phase-shifter 18. The frequency of the demodulation signal is equal to the carrier frequency of the RF signal: the demodulation obtained is therefore direct demodulation, as opposed to intermediate frequency demodulation. The signals fed to the mixers 15 and 16 (from the local oscillator 17) are therefore in phase quadrature. The output signals I and Q of the mixers 15 and 16 are baseband signals. After equalization of their levels, digitization and a decision process, they represent two digital signals transmitted by the RF signal transmitter.

The isolator 12 has two functions:

its provides impedance matching between the antenna 11 and the low-noise amplifier 13 (the latter comprising a transistor, for example) which is matched to the optimal noise impedance: the amplifier 13 is made to operate in an area in which it has the best possible noise factor in order to obtain the best possible amplified signal. This precaution makes it possible to operate the amplifier in a linear region. The input and the output of the isolator 12 are typically matched to an impedance of 50Ω.

it prevents reflection of received signals towards the antenna 11, in order to maximize the power of the received signal.

One problem associated with a demodulator stage of this kind is that a conventional low-loss isolator has a very narrow operating bandwidth, typically 10% to 15%, around the carrier frequency. For example, an isolator operates in a band of only 1 GHz to 2 GHz around a carrier frequency of 10 GHz. In this case it is not possible to use the same demodulator stage for a wider range of RF signal frequencies, in other words frequency agility is restricted to the operating frequency band of the isolator.

One object of the present invention is to remedy this drawback.

To be more precise, one object of the invention is to provide a demodulator stage for demodulating a phase quadrature modulated signal, this stage operating in a wide frequency band that is not limited by the presence of an isolator.

Another object of the invention is to simplify the implementation of a demodulator stage like that shown in FIG. 1.

SUMMARY OF THE INVENTION

The above objectives, and others that will emerge below, are achieved by a demodulator stage for direct demodulation of a phase quadrature modulated signal to provide two baseband signals and comprising:

a matched 90° coupler to which said modulated signal is fed and supplying two phase quadrature modulated signals;

two low-noise amplifiers with identical specifications, each of said amplifiers receiving one of said phase quadrature modulated signals and supplying an amplified signal;

two mixers each receiving one of said amplified signals and a common local oscillator signal, said mixers supplying said baseband signals.

Thus the isolator from the prior art is replaced with a 90° coupler having a much wider band of operating frequencies. Moreover, as the modulated signal is divided by two, the low-noise amplifiers operate in more linear regions. Finally, as phase quadrature is achieved by the coupler, the same local oscillator signal can be applied to both mixers directly. This simplifies the implementation of the demodulator stage and its operating bandwidth is greater than that of the prior art.

The low-noise amplifiers are preferably integrated into an MMIC, enabling them to be matched optimally.

The 90° coupler and the two mixers can be integrated into the same MMIC as the low-noise amplifiers, providing a compact microwave signal receive head consisting of just one MMIC.

The invention also concerns a receiver for phase quadrature modulated signals including a direct demodulator stage of the above type.

Other features and advantages of the invention will emerge from a reading of the following description of one preferred embodiment given by way of non-limiting illustrative example and from the accompanying drawings.

DETAILED DESCRIPTION OF THE PREFERRED EMBODIMENT

Figure 1:
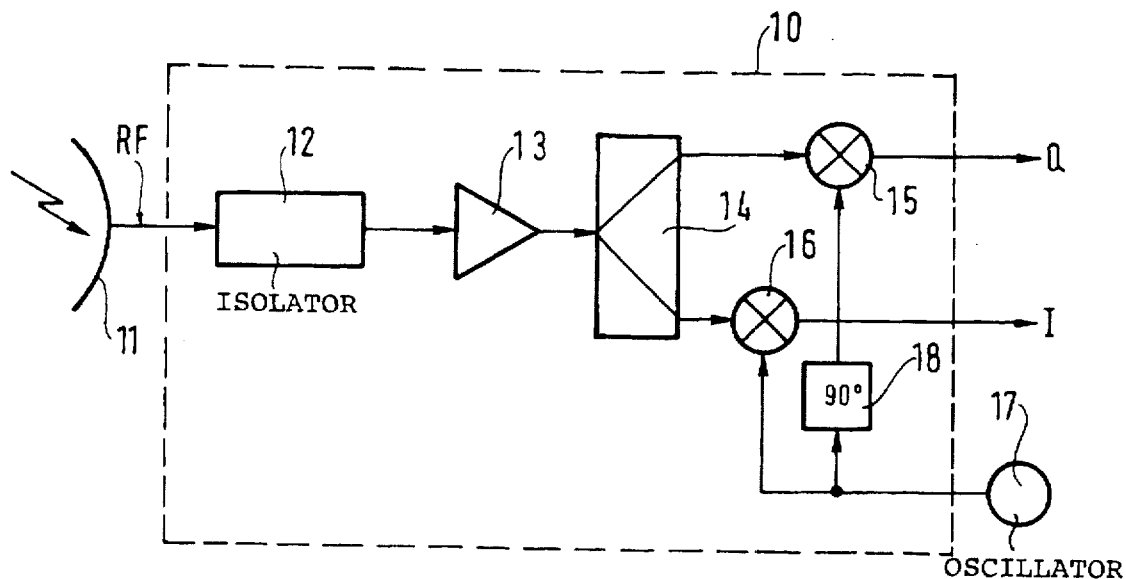
FIG. 1 s prior art demodulator stage for demodulating a modulated signal.

FIG. 1 has been described already with reference to the prior art.

Figure 2:
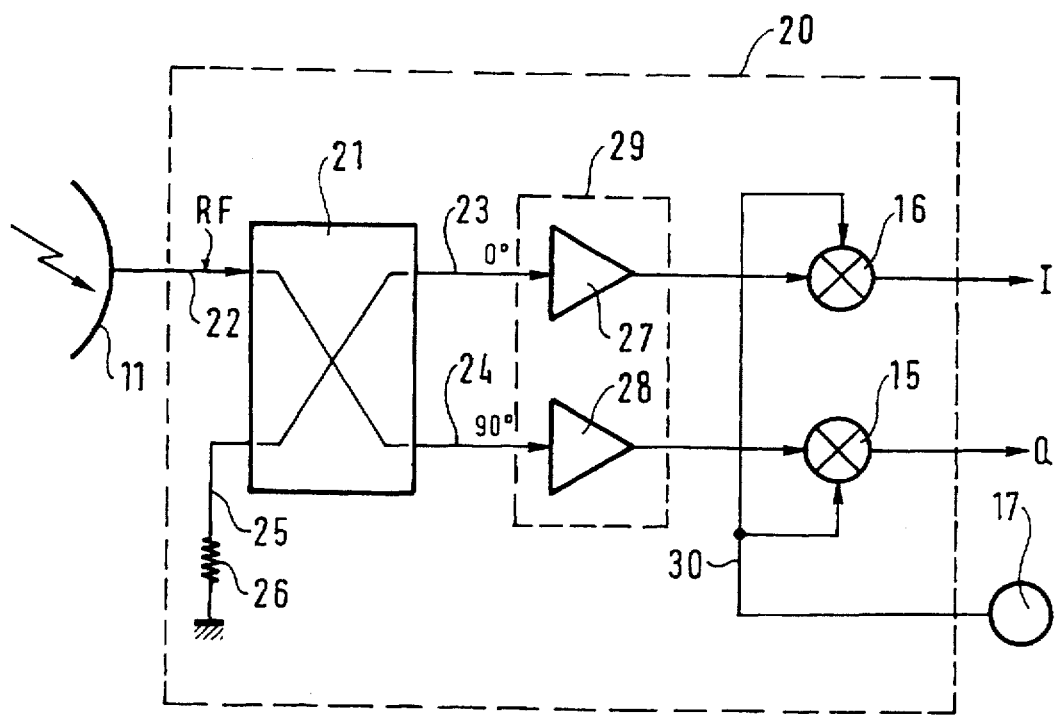
FIG. 2 shows a demodulator stage of the present invention.

FIG. 2 shows a demodulator stage of the present invention. Components identical to those of FIG. 1 carry the same reference numbers.

As in the prior art, the demodulator stage 20 of FIG. 2 receives from the antenna 11 an RF signal phase quadrature modulated at a transmitter. The RF signal is fed to an input port 22 of a 90° matched coupler 21 supplying two phase quadrature modulated signals at its output ports 23, 24. A 90° coupler like the coupler 21 has two channels, a direct channel 22/23 and a phase-shifted channel 22/24. The direct channel produces at the port 23 a signal having the same phase as that fed to the port 22. The phase-shifted channel provides a signal phase-shifted 90° relative to that fed to the port 22. The signals available at the ports 23 and 24 are attenuated 3 dB relative to that fed to the port 22. Note that the signal power spectral density and the noise power spectral density are attenuated by the same amount.

A 50Ω load 26 is connected to the port 25. The function of this load is to absorb the signals reflected by two low-noise amplifiers 27, 28 connected to the ports 23 and 24 (the amplifiers 27 and 28 are generally not matched to an impedance of 50Ω since the aim is to use the best possible noise factor). Analyzing the phases of the signals reflected by the amplifiers 27 and 28 shows that they combine destructively at the port 22 (their phases are opposite) so that impedance matching in respect of the antenna 11 is optimal.

The low-noise amplifiers 27 and 28 are preferably matched so that they have identical specifications. In order to obtain identical specifications, they are preferably integrated into an MMIC 29. Each of the amplifiers 27, 28 supplies an amplified signal to a corresponding mixer 15, 16. Each of the mixers 15, 16 also receives the same demodulation signal 30 from a local oscillator 17. The output signals of the mixers 15 and 16 are baseband signals I and Q.

The demodulator stage of the invention has many advantages over that shown in FIG. 1:

- a coupler (21, FIG. 2) has a much greater bandwidth than an isolator (12, FIG. 1), for the same cost; in this case the operating bandwidth is much greater (by a factor greater than 2, typically between 2 and 4);
- impedance matching at the antenna 11 is automatic because of the destructive combination of the signals reflected by the low-noise amplifiers 27 and 28 at the port 22;
- as the received RF signal is divided by two, the low-noise amplifiers 27 and 28 operate in a more linear region (theoretical gain 3 dB, from which must be subtracted 0.1 dB or 0.2 dB of resistive losses in the coupler 21) and the signal to noise ratio is held constant on each channel;
- direct demodulation is obtained with no additional 90° phase-shifter (18, FIG. 1);
- the low-noise amplifiers can be integrated into an MMIC the cost of which is virtually the same whether it contains one or two amplifiers;
- the 90° coupler 21 can be integrated into the same MMIC as the low-noise amplifiers 27 and 28, and possibly also the two mixers 15 and 16, for an equivalent cost. This yields a complete microwave receive head entirely implemented in MMIC technology, which is not possible if an isolator is used (because a magnetic material is required to implement an isolator). The demodulator stage 20 then comprises one MMIC.

The invention applies to any RF signal modulated with a constellation of phase states (MDP-M or M-PSK), or more generally a plurality of amplitude and phase states (MDAP-M or M-QAM). The invention applies equally to demodulating UHF or VHF signals. One advantageous application of the invention is to receiving frequency evasive signals.

Note that the constellation at the output of the demodulator stage of the invention is unchanged relative to that of the prior art: the demodulator stage of the invention can therefore simply replace an existing stage, no adaptation being required.

The invention also concerns a receiver for phase quadrature modulated signals comprising a direct demodulator stage as described hereinabove.

There is claimed:

1. A demodulator stage for direct demodulation of a phase quadrature modulated signal to provide two baseband signals and comprising:

a matched 90° coupler to which said modulated signal is fed and supplying two phase quadrature modulated signals;

two low-noise amplifiers with identical specifications, each of said amplifiers receiving one of said phase quadrature modulated signals and supplying an amplified signal;

two mixers each receiving one of said amplified signals and a common local oscillator signal, said mixers supplying said baseband signals.

2. The demodulator stage claimed in claim 1 wherein said low-noise amplifiers are integrated into an MMIC.

3. The demodulator stage claimed in claim 2 wherein said 90° coupler is integrated into said MMIC.

4. The demodulator stage claimed in claim 2 wherein said mixers are integrated into said MMIC.

5. A receiver for a phase quadrature modulated signal, said receiver comprising a demodulator stage for direct demodulation of a phase quadrature modulated signal to provide two baseband signals, said demodulator comprising:

a matched 90° coupler to which said modulated signal is fed and supplying two phase quadrature modulated signals;

two low-noise amplifiers with identical specifications, each of said amplifiers receiving one of said phase quadrature modulated signals and supplying an amplified signal; and two mixers each receiving one of said amplified signals and a common local oscillator signal, said mixers supplying said baseband signals.

6. A receiver as claimed in claim 5, wherein said low-noise amplifiers are integrated into an MMIC.

7. A receiver as claimed in claim 6, wherein said 90° coupler is integrated into said MMIC.

8. A receiver as claimed in claim 8, wherein said mixers are integrated into said MMIC.

* * * * *